V. A. FYNN.
SPEED REGULATING APPARATUS.
APPLICATION FILED JULY 5, 1919.
1,345,540.
Patented July 6, 1920.
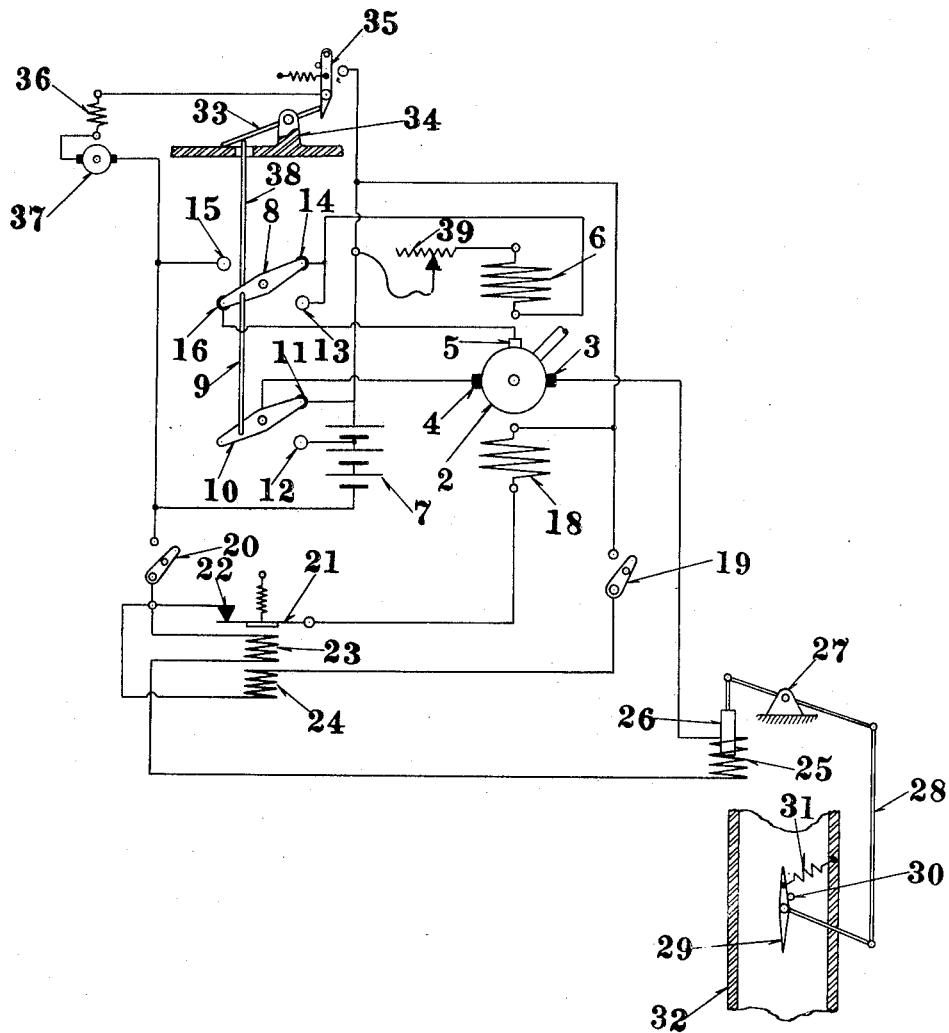
INVENTOR-
Valère A. Fynn
By E. E. Huffman
ATTY-

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SPEED-REGULATING APPARATUS.

1,345,540.         Specification of Letters Patent.      Patented July 6, 1920.

Application filed July 5, 1919. Serial No. 308,869.

*To all whom it may concern:*

Be it known that I, VALÈRE A. FYNN, a subject of the King of England, residing at the city of St. Louis, State of Missouri, United States of America, have invented a certain new and useful Speed-Regulating Apparatus, of which the following is such a full, clear, and exact description as will enable anyone skilled in the art to which it appertains to make and use the same, reference being had to the accompanying drawings, forming part of this specification.

This invention relates to means for electromagnetically controlling the speed of prime movers. It has particular reference to the regulation of the speed of internal combustion engines and to such systems for this purpose which make use of an engine driven generator, the polarity of which is apt to reverse under certain operating conditions.

One of the objects of this invention relates to means for preventing the polarity of the generator from being reversed, while the prime mover is in operation. Another object is to prevent the reversal of the polarity of the generator when the prime mover is being started and a third is to increase the range of regulation to be obtained with a given generator. Other objects and advantages will appear from the following description.

Generators used in connection with electromagnetic governing or controlling devices, or which themselves are adapted to act as such are often compounded either by means of a suitably connected series winding disposed on the field structure or by means of an exciting winding connected to one main and one auxiliary brush, or in some other manner. While such compounded generators have very marked advantages in this connection, their polarity may become reversed either at starting or when the speed of the prime mover falls below that for which the electromagnetic controlling device happens to be set.

In order to prevent reversal while the prime mover is in operation, I provide the generator with an auxiliary or teaser winding connected to some independent source of current such as a storage battery and include in the circuit of this teaser winding a normally closed relay adapted to interrupt the circuit of the teaser winding as soon as the generator current rises above a certain value and to keep this circuit interrupted over the operating range of the generator current, *i. e.*, over the range which is effective as far as the speed control of the prime mover is concerned. I prefer to so constitute this relay that it will open the teaser circuit with one value of the generator current in one direction, but that a much higher value of this generator current will be required to open the relay in case this current is reversed. In order to increase the regulating range in such systems as make use of a storage battery in connection with an engine driven generator, I provide means for varying the magnitude of the battery or independent E. M. F. and to include in the exciting circuit of the generator the total battery voltage at times when only a part of said voltage is included in the armature circuit. In order to make sure that the generator will not reverse at starting, I provide the starting switch of the cranking motor with an interlocking device which renders it inoperative, except when the full battery voltage is applied to the exciting circuit of the generator.

The drawing shows the invention as applied to a speed controlling system in which the throttle valve of an internal combustion engine is under the control of a controller connected in circuit with a compound generator of the Sayers type and a storage battery. The armature 2 of the engine driven generator carries main brushes 3 and 4 which are located between the two main brushes. The field structure carries an exciting winding 6 normally connected to the auxiliary brush 5 and the main brush 4. Included in this exciting circuit is the speed adjusting resistance 39. The field structure also carries the teaser winding 18, one end of which is permanently connected to the negative pole of the storage battery 7 while the other can be connected to the positive pole thereof by means of the relay armature 21 when the switch 20 is closed. The exciting winding 25 of the speed controller is connected in circuit with the main brushes 3, 4 of the generator, with the battery 7 and with the magnetizing coil 23 of the relay 21. The other magnetizing winding 24 of said relay is connected across the battery 7 when the switches 19 and 20 are closed. The controller is diagrammatically shown as consisting of the exciting winding 25, the plunger 26 coöperating with same and connected by means of a series of levers 28 pivoted at 27 with the throttle valve 29 of the internal combustion engine. This throttle valve is located in the conduit 32 and is normally held open against the stop 30 by means of the spring 31.

The switch 10 coöperating with the contacts 11 and 12 makes it possible to vary the magnitude of the independent E. M. F. derived from the battery 7 and included in the armature circuit of the engine driven generator. The switch 8 coöperates with the stationary contacts 13, 14, 15, 16. In the position shown, it connects one end of the exciting winding 6 with the auxiliary brush 5, and the voltage then impressed on 6 is that appearing between the brushes 4 and 5. When in its other position, it connects this same end of the exciting winding 6 with the positive terminal of the battery 7 in which case the full battery voltage is impressed on the exciting winding 6. The switches 8 and 10 are mechanically interconnected by means of the rod 9. This rod is provided with an extension 38 adapted to coöperate with the locking lever 33 pivoted at 34 and normally preventing the starting switch 35 from being closed. This switch connects the cranking motor 36, 37 to the battery 7 and allows of the internal combustion engine being started. With the switches 8 and 10 in the position shown in which all of the independent E. M. F. is in circuit with the armature of the engine driven generator and the exciting winding 6 is connected between the auxiliary brush 5 and the main brush 4, the starting switch 35 cannot be closed but when the switches 8 and 10 are moved into their other position in which the exciting winding 6 is connected across the whole of the independent E. M. F. or battery 7, the rod 38 moves the lever 33 out of the path of switch 35 and makes it possible, if it be desired, to crank the engine by means of the motor 37.

In normal operation, the switches 20 and 19 are closed. The windings 23 and 24 are so proportioned that with a certain amount of charging current flowing from the engine driven generator to the battery through the winding 23, the relay 21 will be open. If the controller 25 operates with a range of say 4 to 8 amperes, the spring 31 being just balanced and the throttle valve 29 wide open with 4 amperes and said valve being practically closed with 8 amperes, then the winding 23 may be so proportioned that with 3 amperes charging current and 24 connected to the battery the relay 21 will open and stay open for all higher values of said charging current. The ampere turns of the coil 23 and 24 can readily be so proportioned that the relay 21 will not open even with a large discharge current flowing through the controller circuit. This condition exists when the switch 20 is closed with the engine at rest and switch 10 on point 11. It also exists, but the discharge current is considerably smaller, when switch 20 is closed with switch 10 on point 12. It is therefore considerably safer not to start the engine with switch 10 on point 11 and it is still safer not to start it unless the winding 6 is connected to the full battery voltage because the magnetization to be produced by the teaser winding in order to prevent reversal during the normal operation of the engine need not be large and may not be sufficiently large to prevent reversal at starting.

Supposing that two-thirds of the total ampere turns required to open relay 21 is supplied by the shunt coil 24 and one-third by the shunt coil 23 and further suppose that this one-third is produced with three amperes flowing through 23, then it will require six amperes discharge current through 23 in order to annul or counterbalance the magnetization produced by the shunt coil 24 and it will require an additional nine amperes discharge current through the coil 23 in order to produce a magnetization equal to that required to open the relay 21. In other words, this relay will not open until the discharge current has reached a value of fifteen amperes; but the sensitiveness of the relay 21 to a discharge current can be decreased by diminishing the series ampere turns and increasing the shunt ampere turns on said relay, thus if one-fourth of the total relay ampere turns is produced with three amperes flowing through the series winding 23, then it will require nine amperes discharge current through 23 to equal and oppose the shunt ampere turns and an additional twelve amperes discharge current to produce enough magnetization to open the relay. Under these conditions, this relay will not open with less than twenty-one amperes discharge current.

In operating the embodiment of the invention shown in the figure and assuming the engine to be at rest, switches 8 and 10 should be placed on points 13 and 12, after which the starting switch 35 controlling the cranking motor 37 will be closed and the engine brought up to speed, with the certainty that the generator will excite in the right direction. As soon as the engine is running, switches 19 and 20 may be closed. As an alternative, these switches may be closed before closing switch 35. It is thus seen that the interlocking device between the switches 8, 10 and 35 not only positively prevents reversal but adds to the liberty of action of the operator. Without this interlocking device, and in such cases where the relay 21 can not be dimensioned to prevent reversal at starting, it would be necessary to start the engine before closing the switches 19 and 20. With switch 10 on point 12 and all of the regulating resistance 39 excluded from the exciting circuit 6, the engine will be held to its lowest speed by the controller 25 and this controller will be rendered operative by the opening of the relay 21 after the current through 25 exceeds three amperes. In order to obtain the next higher speed, switch 10 should be moved to point 11 and all higher speeds are preferably secured by increasing the resistance in circuit with the winding 6. Should the speed of the engine drop too low at any time during the operation thereof, the current through 25 will then fall below three amperes and the relay 21 will close the circuit of the teaser winding 18 thus boosting the voltage of the engine driven generator and preventing the current from falling much below three amperes. In normal operation, and with the engine tending to run slowly, the armature of the relay 21 will open and close more or less rapidly.

Having fully described my invention, what I claim as new and desire to secure by Letters Patent of the United States is:

1. The combination of a prime mover, electromagnetic speed controlling means therefor, means for adjusting the controlling means to maintain desired prime mover speeds, a motor for starting the prime mover, a starting switch therefor, and means preventing closing of the starting switch when the speed adjusting means is in a predetermined position.

2. The combination of a prime mover, speed controlling means therefor, means for actuating the speed controller comprising a generator driven by the prime mover, an independent source of E. M. F. in circuit with the generator, means for varying the magnitude of said E. M. F., a motor for starting the prime mover, a starting switch therefor, and means preventing closing of said switch when the E. M. F. adjusting means is in a predetermined position.

3. The combination of a prime mover, speed controlling means therefor, means for actuating the speed controller comprising a generator driven by the prime mover, an independent source of E. M. F. in circuit with the generator, and means for including all of said E. M. F. in exciting circuit of the generator.

4. The combination of a prime mover, speed controlling means therefor, means for actuating the speed controller comprising a generator driven by the prime mover, an independent source of E. M. F. in circuit with the generator, a motor for starting the prime mover and starting switch therefor, and means preventing the closing of said switch except when the independent source of E. M. F. is included in the exciting circuit of the generator.

5. The combination of a prime mover, speed controlling means therefor, means for actuating the speed controller comprising a generator driven by the prime mover, an independent source of E. M. F. in circuit with the generator, a teaser winding on the generator and in circuit with said source, and means governed by the current output of the generator for disconnecting the teaser winding from said source.

6. The combination of a prime mover, speed controlling means therefor, means for actuating the speed controller comprising a generator driven by the prime mover, an independent source of E. M. F. in circuit with the generator, a teaser winding on the generator and in circuit with said source, a relay for disconnecting the teaser winding from the source, said relay being provided with an exciting winding in circuit with the generator and a second exciting winding in circuit with the independent source of E. M. F.

7. The combination of a prime mover, speed controlling means therefor, means for actuating the speed controlling means comprising a generator driven by the prime mover, means for controlling the excitation of the generator comprising a relay provided with an exciting winding in circuit with the generator, and a second exciting winding, and means for supplying a substantially constant E. M. F. to said second winding.

8. The combination of a prime mover, speed controlling means therefor, means for actuating the speed controlling means comprising a generator driven by the prime mover, a battery in circuit with the generator and connected to oppose the generator E. M. F., means for controlling the excitation of the generator comprising a relay provided with an exciting winding in circuit with the generator and a second exciting winding in circuit with the battery, said windings being connected to magnetize in the same direction when the generator delivers a charging current to the battery.

In testimony whereof I have hereunto set my hand and affixed my seal.

VALÈRE A. FYNN. [L. s.]